United States Patent Office 2,770,617
Patented Nov. 13, 1956

2,770,617

2,5-BIS-ETHYLENEIMINO-HYDROQUINONE AND PROCESS FOR PREPARING SAME

Adrian Marxer, Basel, Switzerland, assignor to Ciba Pharmaceutical Products, Inc., Summit, N. J.

No Drawing. Application April 25, 1955,
Serial No. 503,785

Claims priority, application Switzerland April 30, 1954

6 Claims. (Cl. 260—239)

This invention relates to a new compound, 2,5-bis-ethylenimino-hydroquinone, which can be represented by the formula

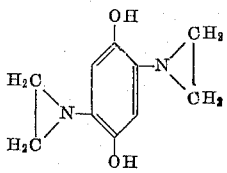

and salts thereof. The invention also embraces processes for preparing the novel compound. In contradistinction to other ethylenimino-compounds the new ethylenimine derivative decomposes only gradually between 220 and 240° C. while becoming black in color. It is almost insoluble in organic solvents and water. On the basis of its infra-red spectrum, which indicates the absence of hydroxyl groups in the crystals but the presence of ions, the above hydroquinone is in its tautomeric form, i. e. the salt of the formula

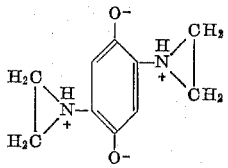

Domagk, Petersen and Gauss have disclosed in the "Zeitschrift für Krebsforschung," vol. 59, page 617 (1954), that by the reaction of quinone with 2 mols of ethylenimine there is obtained 2,5-bis-ethylenimino-quinone of the formula

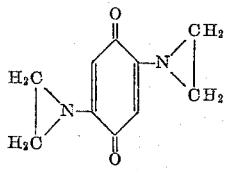

They state that this compound, when administered subcutaneously to rats inoculated with Yoshida tumours intramuscularly, checks the growth of the tumour. Our investigations have shown that this compound, when administered orally, does not check the growth of the Crocker sarcoma 180 or the Ehrlich carcinoma (solid form) of the mouse (the named tumours are described for example by L. Y. Dunham and H. L. Stewart in the Journal of the National Cancer Institute, vol. 13, page 1299 (1953)). The bis-ethylenimino-hydroquinone of the present invention and its salts are effective against *Entamoeba histolytica*, also called *Amoeba dysenteriae*, and are useful as amoebicides.

It is known that aminoquinones are obtained by the reaction of quinones with amines. Aminohydroquinones have not yet been obtained in this manner (compare, for example, Martynoff and Tsatsas, Bulletin de la Société Chimique de France, volume 14, page 52 (1947); Cavallito, Soria and Hoppe, J. Am. Chem. Soc., vol. 72, page 2661 (1950)).

According to the present invention it has been unexpectedly found that in the reaction of quinone with ethylenimine bis-ethylenimino-hydroquinone is obtained when certain reaction conditions are employed. Accordingly, the process of the invention is characterized in that paraquinone is reacted with ethylenimine and the resulting 2,5-bis-ethylenimino-hydroquinone is isolated and/or any 2,5-bis-ethylenimino-para-quinone formed is treated with a reducing agent. More especially the reaction is conducted in a solvent, such as dioxane, ethyl alcohol, isopropyl alcohol or butyl alcohol, isopropyl ether or the like, and with a molecular ratio of para-quinone to ethylenimine from about 1:2.5 to about 1:4. The reaction is advantageously carried out under anaerobic conditions, that is in the absence of atmospheric oxygen, for example, in an atmosphere of nitrogen or hydrogen and at a raised temperature, for example 40–100° C. The isolation of the product is carried out advantageously by extracting any quinone derivative that may be formed in addition to the hydroquinone compound by means of a solvent.

According to the process of the invention a resulting mixture of 2,5-bis-ethylenimino-hydroquinone and 2,5-bis-ethylenimino-para-quinone can be treated directly with a reducing agent or the 2,5-bis-ethylenimino-para-quinone can be separated and subsequently reduced. The reduction can be carried out more especially with hydrogen in the presence of a nickel catalyst. In order to isolate the hydroquinone derivative so formed it is dissolved in a slight excess of cold alkali hydroxide, such as sodium hydroxide, advantageously in an atmosphere of nitrogen, the catalyst is removed, and the 2,5-bis-ethylenimino-hydroquinone is precipitated from the solution with the calculated quantity of cold acid, for example, acetic acid at a temperature of about 10° C. The reduction may also be carried out with other agents suitable for the transformation of quinones to hydroquinones, for example with a di-metal hydride such as lithium-aluminum hydride or sodium boron hydride, for example, in the presence of a solvent such as ether or dioxane, or with sodium dithionite.

The new compound is also obtained by converting in a hydroquinone, which has in the 2- and 5-positions substituents convertible into the ethylenimino group, these substituents into the latter. A substituent convertible into the ethylenimino group is, for example, a reactive esterified β-hydroxyethylamino groups, advantageously a β-halogen ethylamino group, such as for example the β-chlorethyl amino group. The conversion of these groups according to the present invention can be carried out by treatment with an alkaline agent, such as for example an alkali metal hydroxide or alkaline earth metal hydroxide.

The resulting 2,5-bis-ethylenimino-hydroquinone may be converted into salts of metals. Thus it may be dissolved in an alkali hydroxide, to form the corresponding salt, e. g. sodium, potassium or lithium salts.

The 2,5-bis-ethylenimino-hydroquinone or salts thereof obtained according to the present invention can be used as medicaments in the treatment of diseases induced by amoebae. For this purpose, they may be administered orally or parenterally. The aforesaid products are made up in any desired pharmaceutical preparation or dosage unit form, preferably with an adjuvant facilitating the administration thereof, for example, in admixture with a pharmaceutical organic or inorganic carrier material suitable for enteral, especially oral or parenteral application. For the production of these preparations such substances are employed as do not react with the new compounds, as for example water, gelatine, lactose, starches, magnesium stearate, talc, vegetable oils, benzyl alcohols, gums, polyalkylene glycols, petroleum jelly, cholesterol or other known medicament carriers. The pharmaceutical preparations can be made up, for example, into tablets or dragées. They are sterilized if desired, and/or may contain auxiliary substances, such as preservative, stabilizing, wetting or emulsifying agents, salts which vary the osmotic pressure or buffer substances.

The amount of 2,5-bis-ethylenimino-hydroquinone or of its salts in the preparations comprising the invention may be varied as long as a sufficient proportion is present to provide a therapeutically effective dose. Thus, the content of 2,5-bis-ethylenimino-hydroquinone or the salts thereof in the various dosage unit forms may amount, for example, from about 0.5 percent to about 50 percent by weight, or in a single dose about 1 mg. to about 150 mg. may be present to obtain a therapeutic effect, as for example, in the form of tablets or an ampoule for injection.

For example, a tablet of the following composition can be prepared in the usual way:

|  | Mg. |
|---|---|
| 2,5-bis-ethylenimino-hydroquinone | 10 |
| Lactose | 40 |
| Tertiary calcium phosphate | 35 |
| Gelatine | 1 |
| Wheat starch | 33 |
| Arrowroot | 15 |
| Magnesium stearate | 0.4 |
| Talc | 5.6 |
|  | 140.0 |

The following examples illustrate the invention.

*Example 1*

21.6 grams of para-quinone are dissolved in 175 cc. of dioxane in a round flask fitted with a stirrer, reflux condenser, dropping funnel, thermometer and inlet for nitrogen. 25.8 grams of ethylenimine in 50 cc. of dioxane are introduced dropwise but rapidly while cooling with water. The internal temperature increases from 20–40° C. The cooling bath is removed and the reaction mixture is stirred for several hours longer in a current of nitrogen. At first red crystals separate out. Soon a whitish microcrystalline powder begins to separate out in copious amounts. After 14 hours the suspension is heated at the boil with continued stirring, whereby the red crystals dissolve. By filtering the hot suspension with suction and thoroughly washing the precipitate with dioxane 2,5-bis-ethylenimino-hydroquinone is obtained in an analytically pure state. When the substance is heated it becomes black in color at a temperature of 220–240° C. In the infra-red spectrum of the so-obtained crystals neither a C=O band nor an OH band is to be found, but absorptions occur at $3.67\mu$ and $3.88\mu$ (in Nujol, thickness 0.01 mm.).

2,5-bis-ethylenimino-para-quinone is obtained from the above dioxane filtrate by concentrating the latter and cooling it.

*Example 2*

1.9 grams of 2,5-bis-ethylenimino-para-quinone, obtained by the reaction of 3 mols of para-quinone with 2 mols of ethylenimine, are suspended in 200 cc. of dry ethyl acetate, and agitated with hydrogen in the presence of 2 grams of Raney nickel. In about one hour the calculated quantity of hydrogen will have been taken up and the absorption of hydrogen ceases. The resulting 2,5-bis-ethylenimino-hydroquinone is separated together with the nickel catalyst, and the said hydroquinone is rapidly dissolved with 30 cc. of an ice-cooled 1 N-solution of caustic soda in an atmosphere of nitrogen, the solution is filtered, and immediately mixed with 14.5 cc. of 2 N-acetic acid, the precipitate is filtered off with suction, washed with alcohol and dioxane and dried. In this manner there is obtained the 2,5-bis-ethylenimino-hydroquinone described in Example 1.

*Example 3*

21.6 grams of para-quinone dissolved in 175 cc. of dioxane are introduced dropwise in the course of 30 minutes into a solution, maintained at 50° C., of 25.8 grams of ethylenimine in 150 cc. of dioxane. After a short time a white crystalline precipitate begins to separate, and increases upon further stirring for 7 hours at 50° C. The suspension is then heated at the boil for a short time, filtered with suction while hot, and the precipitate is washed with dioxane. The residue consists of 2,5-bis-ethylenimino-hydroquinone which is obtained in excellent yield.

Only a small amount of 2,5-bis-ethylenimino-para-quinone can be isolated from the dioxane filtrate.

*Example 4*

172 grams of para-quinone are dissolved in 1.4 liters of dioxane and filtered. 172 grams of ethylenimine in 300 cc. of dioxane are added to this solution in the course of 20 minutes while stirring at an internal temperature of 40–45° C., cooling with water being necessary at the beginning. The mixture is then maintained for 4 hours at 60° C. and then heated for a short time at 100° C. Working up is carried out as described in Example 1. Neither from the crystals nor from the mother liquor can the 2,5-bis-ethylenimino-quinone be obtained, but only the cream-colored crystalline powder of 2,5-bis-ethylenimino-hydroquinone.

*Example 5*

3 grams of dihydrochloride of 2,5-bis($\beta$-chlorethylamino)-hydroquinone are dissolved in 75 cc. of water with the exclusion of air and 75 cc. of 10 N-solution of caustic soda are added. The clear solution is put on a water-bath having a temperature of 50° C. with the exclusion of air and the temperature increased to 80° C. in 20 minutes, and the solution is kept at this temperature for 10 minutes. It is then cooled, filtered rapidly with a little active charcoal and neutralized with 43 cc. of glacial acetic acid while cooling. The precipitated, brown product is filtered with suction, washed thoroughly with water and boiled with 200 cc. of alcohol for a short time, any resulting byproducts being dissolved. The above described 2,5-bis-ethyleniminohydroquinone remains behind and is isolated by filtering with suction.

The 2,5-bis-($\beta$-chlorethylamino)-hydroquinonedihydrochloride used as starting material can be obtained in the following manner:

31.8 grams of $\beta$-chlorethylamine in 50 cc. of dioxane are added dropwise to a solution of 64.8 grams of benzoquinone in 450 cc. of dioxane, and the reaction mixture is stirred for 7 hours at 60° C. The red to violet crystals of 2,5-bis-($\beta$-chlorethylamino)-paraquinone precipitate from the solution. By concentrating the mother liquor a further quantity can be obtained. 5.26 grams of 2,5-bis-($\beta$-chlorethylamino)-para-quinone are suspended in 150 cc. of absolute alcohol and after the addition of about 3 grams of Raney nickel agitated with hydrogen. After the calculated quantity of hydrogen has been taken up, the hydrogenation is interrupted and the alcohol separated rapidly from the catalyst. By adding an excess of 6 N-alcoholic hydrochloric acid the 2,5-bis-($\beta$-chlorethylamino)-hydroquinone present is converted to the dihydrochloride of 2,5 - bis - ($\beta$-chlorethylamino)-hydroquinone, which is separated off as a crystalline product melting at 221° C. (with decomposition). The compound obtained is extremely easily oxidizable.

The same compound can be obtained by treating 3.84 grams of 2,5-bis-ethylenimino-hydroquinone in 50 cc. of absolute alcohol with 50 cc. of 2 N-alcoholic hydrochloric acid with the exclusion of air. The substance is temporarily dissolved, whereupon the above described dihydrochloride of 2,5 - bis - (β-chlorethylamino)-hydroquinone crystallizes out.

*Example 6*

8.6 grams of ethylenimine dissolved in 50 cc. of dioxane are added to 21.6 grams of para-quinone in 175 cc. of dioxane at an internal temperature of 20° C. The temperature thereupon rises to 40° C. The mixture is then stirred for 7 hours at room temperature. For the purpose of separating off any resulting 2,5-bis-ethylenimino-para-quinone, the reaction mixture is heated at the boil for 10 minutes and the insoluble 2,5-bis-ethylenimino-hydroquinone is isolated by filtering with suction. The cream colored powder is identical with the product obtained in Examples 1–5.

*Example 7*

The quantities of para-quinone, ethylenimine and dioxane described in Example 6 are agitated for 5 hours in a hydrogenating apparatus. 10 grams of Raney nickel are then added and the whole is further agitated in an atmosphere of hydrogen until no more hydrogen is taken up. The mixture is filtered with suction and washed with alcohol. For the purpose of separating the nickel the filter residue is agitated immediately with 200 cc. of a 2 N-caustic soda solution again in a hydrogen atmosphere, while cooling with ice water, and filtered with suction after a few minutes in a manner analogous to that described in Example 2. The catalyst remaining behind is washed with water and the filtrate precipitated with 195 cc. of 2 N-acetic acid while cooling. The resulting, whitish powder is 2,5-bis-ethyleniminohydroquinone.

What is claimed is:

1. A process which comprises contacting paraquinone with ethylenimine in molecular ratio of from about 1:2.5 to about 1:4 at a temperature of from about 40° C. to about 100° C., and isolating the resulting 2,5-bis-ethylenimino-hydroquinone.

2. A process according to claim 1, in which the reaction is carried out under anaerobic conditions.

3. A compound of the group consisting of 2,5-bis-ethylenimino-hydroquinone and the salts thereof.

4. The 2,5-bis-ethylenimino-hydroquinone in its tautomeric form.

5. A compound of the group consisting of 2,5-bis-(β-halogenethylamino)-hydroquinone and the salts thereof.

6. 2,5 - bis(β-chlorethylamino)-hydroquinone dihydrochloride.

References Cited in the file of this patent

Domagk et al.: Chem. Abst., vol. 48, col. 11658 (1954).
Martznoff et al.: Bull. de la Soc. Chem. de France, vol. 14, p. 52 (1947).
Cavallito: J. A. C. S., vol. 72, p. 2661 (1950).